(12) United States Patent
Sato et al.

(10) Patent No.: US 7,614,118 B2
(45) Date of Patent: Nov. 10, 2009

(54) TWO-SHAFT HINGE MECHANISM ENABLING HARNESS WIRING

(75) Inventors: Hitoshi Sato, Tokyo (JP); Sakae Higano, Tokyo (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 222 days.

(21) Appl. No.: 10/581,917

(22) PCT Filed: Dec. 10, 2004

(86) PCT No.: PCT/JP2004/018475

§ 371 (c)(1),
(2), (4) Date: Jun. 6, 2006

(87) PCT Pub. No.: WO2005/057027

PCT Pub. Date: Jun. 23, 2005

(65) Prior Publication Data

US 2007/0151076 A1 Jul. 5, 2007

(30) Foreign Application Priority Data

Dec. 11, 2003 (JP) ............................. 2003-413054

(51) Int. Cl.
*E05D 3/10* (2006.01)
(52) U.S. Cl. .............................. 16/367; 16/302; 16/303
(58) Field of Classification Search ................... 16/366, 16/367, 302, 337, 338, 340, 303; 379/433.13; 455/575.3
See application file for complete search history.

(56) References Cited

U.S. PATENT DOCUMENTS

| 5,867,872 | A  | * | 2/1999 | Katoh ........................ 16/337 |
| 6,587,333 | B2 | * | 7/2003 | Tseng et al. ................ 361/681 |
| 6,948,217 | B2 | * | 9/2005 | Higano et al. ................ 16/303 |
| 7,055,218 | B2 | * | 6/2006 | Lu et al. ...................... 16/367 |
| 7,158,816 | B1 | * | 1/2007 | Mizuta et al. ............. 455/575.3 |
| 2005/0119023 | A1 | * | 6/2005 | Sudo et al. ............... 455/550.1 |

FOREIGN PATENT DOCUMENTS

JP          9-62399          3/1997

(Continued)

*Primary Examiner*—Victor Batson
*Assistant Examiner*—Jeffrey O'Brien
(74) *Attorney, Agent, or Firm*—Flynn, Thiel, Boutell & Tanis, P.C.

(57) ABSTRACT

Two-shaft hinge mechanism components enabling harness wiring are provided to realize durability, reduction in size and weight and a mechanism to restrict rotation, in cellular phones, notebook computers and remote controllers required to have a smaller size, less weight and new functions. Rotation shaft and opening/closing shaft are inserted into coil spring, concave and convex cams, and a caulking component, to assemble a rotation shaft torque unit and an opening/closing torque unit. The units are attached to a hinge housing to constitute the two-shaft hinge. The opening/closing torque unit is disposed either on the left or right side of the hinge housing. A pipe-like shaft with a hollow is employed as rotation shaft, whereby harness wiring is provided easily. The torque unit is configured independently from the rotation shaft and the opening/closing shaft to achieve generation of a stable torque and click, improvement of durability, easy assembly of the components, reduction of size and weight by reducing the number of components, and ensuring of space by disposing the components in a concentrated manner.

12 Claims, 8 Drawing Sheets

FOREIGN PATENT DOCUMENTS

| | | |
|---|---|---|
| JP | 2000-240636 | 9/2000 |
| JP | 2001-295829 | 10/2001 |
| JP | 2002-155923 | 5/2002 |
| JP | 2002-206520 | 7/2002 |
| JP | 2002-310129 | 10/2002 |
| JP | 2003304316 A * | 10/2003 |

* cited by examiner (a)

(b)

(a)   (b)

TWO-SHAFT HINGE MECHANISM ENABLING HARNESS WIRING

FIELD OF THE INVENTION

The present invention relates to two-shaft hinge components which are used in a folding/rotating mechanism part on a small electronic device such as cellular phones, notebook computers, electronic organizers, DVD monitors, and remote controllers.

BACKGROUND OF THE INVENTION

Conventionally, rotation friction torques of opening/closing shafts and rotation shafts of two-shaft hinges are generated in most cases by mechanisms employing structures of a plate member wrapping around a shaft or structures of a pressed disc spring.

FIG. 16 shows an example of a conventional two-shaft hinge. A plate spring 54 formed into a wave-like shape and a bracket 56 are fixed onto each side of a supporting plate 52 of a pressed opening/closing shaft by means of a fixing flange 53. A rotation shaft 57 pierces through the supporting plate 52 of the opening/closing shaft at the center thereof. A rotational torque is provided by friction of a pressed plate spring 59.

In the conventional hinge, a rotating angle stopper mechanism is not provided, and thus a torque is generated by pressing a friction plate that uses the repulsive force of a disc spring. This leads to problems such as wear of the supporting plate 52 and the bracket 56, free-play and looseness due to deformation of the plate spring 54, and low mechanical durability. The fluctuation in torque or deterioration of durability in time causes degrading of the quality and a breakdown of the device. In the latest two-shaft hinges, compared to the conventional hinges, the operability and feelings in opening/closing and rotating are required, and thus a mechanism for limiting the rotating angle and opening/closing angle and a stable torque value, high durability, and reduction in size and weight are strongly demanded.

SUMMARY OF THE INVENTION

The present invention provides two-shaft hinge components which enable harness wiring by using a hollow rotation shaft and thereby realize durability, and reduction in size and weight in cellular phones or notebook computers in which continuing reduction in size and weight is demanded.

The present invention obtains a two-shaft hinge having a two-shaft structure comprising: a rotation shaft; an opening/closing shaft; a rotation torque unit in which a plurality of rotation torque generating portions are provided on the rotation shaft, the rotation torque generating portions being assembled by putting a first coil spring around an outer periphery of the rotation shaft having a penetrating hole and by abutting a first fixing cam and a first rotating cam on both ends of the first coil spring; and an opening/closing torque unit in which a plurality of opening/closing torque generating portions are provided on the opening/closing shaft, the opening/closing torque generating portions being assembled by putting a second coil spring around the opening/closing shaft and by abutting a second fixing cam and a second rotating cam on both ends of the first coil spring, wherein an axial direction of the rotation shaft and an axial direction of the opening/closing shaft are assembled to a hinge housing to be perpendicular to each other, the hinge housing has a hole through which the rotation shaft pierces, the torque units generate a sliding torque and a click torque at a rotation, and an opening/closing operational function on the rotation shaft and the opening/closing shaft, the opening/closing torque unit is assembled to either right or left side of the rotation torque unit, and a hole through which a harness wiring can pass is provided on the other side of the rotation torque unit in the hinge housing.

The axis lines of the axial direction of the rotation shaft and of the axial direction of the opening/closing shaft are perpendicular to each other, but do not necessarily intersect with each other.

Another embodiment of the invention obtains a two-shaft hinge having a two-shaft structure, comprising: a rotation shaft; an opening/closing shaft; a rotation torque unit in which a pair of rotation torque generating portions is provided on the rotation shaft, the rotation torque generating portions being assembled by putting a first coil spring around an outer periphery of the rotation shaft having a penetrating hole and by abutting a first fixing cam and a first rotating cam on one end of the first coil spring; and an opening/closing torque unit in which a plurality of opening/closing torque generating portions are provided on the opening/closing shaft, the opening/closing torque generating portions being assembled by putting a second coil spring around the opening/closing shaft and by abutting a second fixing cam and a second rotating cam on both ends of the second coil spring, wherein an axial direction of the rotating axis and an axial direction of the opening/closing shaft are assembled to a hinge housing to be perpendicular to each other, the hinge housing has a hole through which the rotation shaft pierces, the torque units generate a sliding torque and a click torque at a rotation, and an opening/closing operations function on the rotation shaft and the opening/closing shaft, the opening/closing torque unit is assembled to either right or left side of the rotation torque unit, and a hole through which a harness wiring can pass is provided on the other side of the rotation torque unit in the hinge housing.

A third embodiment of the two-shaft hinge has an additional feature that the rotation torque unit is assembled on the rotation shaft, a plurality of the rotation torque generating portions are assembled on the rotation torque unit, and have torque generating operations, to generate the sliding torque and the click torque by abutting the first fixing cam and the first rotation cam, the torque generating operations are different and independent to one another by combining the first fixing cam and the first rotation cam having different positions of a concave groove and a convex protrusion of the first fixing cam and the first rotating cam or by combining different numbers of the cams, whereby the two-shaft hinge that shows a more complex rotation torque is thereby realized.

A fourth embodiment of the two-shaft hinge has a feature that the opening/closing torque unit is assembled on the opening closing shaft, a the plurality of the opening/closing torque generating portions are assembled on the opening/closing torque unit and have torque generating operations to generate the sliding torque and the click torque by abutting the second fixing cam and the second rotating cam, the torque generating operations are different and independent to one another by combining the second fixing cam and the second rotation cam having different positions of a concave groove and a convex protrusion of the second fixing cam and the second rotation cam or by combining different numbers of the cams, whereby the two-shaft hinge that shows more complex opening/closing torque characteristics thereby is realized.

A fifth embodiment of the two-shaft hinge has a feature that a cross-section of a part of the rotation shaft and the opening/closing shaft is other than a circle, or is formed to be a quadrangle or a shape having a major axis and a minor axis, allowing the first and the second fixing cams for rotation and opening/closing, which are used respectively in the rotation torque generating portions and the opening/closing torque generating portions, to move respectively in the axial direction of the rotation shaft and the axial direction of the opening/closing shaft, but inhibiting the first and the second fixing cams from rotating with respect to the rotation shaft.

A sixth embodiment of the two-shaft hinge includes a stopper mechanism to restrict a rotation angle and an opening/closing angle of the rotation shaft and the opening/closing shaft so that rotation ranges of the rotation shaft and the opening/closing shaft are restricted.

A seventh embodiment of the two-shaft hinge includes a disc spring, a waved plate spring, or a thin plate spring in place of the first and the second coil springs which generate an abutting force in the torque generating portions used in the rotation torque unit and the opening/closing torque unit, in order to reduce the size of the two-shaft hinge.

An eighth embodiment of the two-shaft hinge wherein the rotation shaft has the penetrating hole in which a throughhole is provided at a center of the rotation shaft, in order to enable the harness wiring.

A ninth embodiment of the two-shaft hinge has a feature that a case for the rotation shaft and a case for the opening/closing shaft in each of which an outer periphery has a groove or a deformed cross-section other than a circle are fitted with or fixed to the first and the second rotating cams in each of which an outer periphery has a protrusion or a deformed cross-section, in order to effectively transmit a sliding torque force and a click torque force, which are generated in the first and the second rotating cams used on the rotation shaft and the opening/closing shaft, to the hinge housing. A reduction in size, improvement in strength, and improvement in durability can be thereby achieved.

A tenth embodiment of the two-shaft hinge has a feature that the first rotating cam used in the rotation torque generating portions is configured to be a bottom portion to which the rotation torque unit is fitted and attached in the hinge housing, to reduce the number of components and size, and improve the strength of the hinge housing.

An eleventh embodiment of the two-shaft hinge has a feature that the rotation torque unit and the opening/closing torque unit are assembled as an independent unit and the torque units are fitted and attached to or screwed into the hinge housing in which a means for fitting or screwing to fix is provided in advance.

A twelfth embodiment of the two-shaft hinge includes a fixing base component adhered to the rotation shaft for mounting and fixing the two-shaft hinge to a device chassis, wherein the two-shaft hinge is fixed by the base component.

The present invention realizes a highly durable two-shaft hinge because it employs a plurality of cam mechanisms to stably and securely generate a sliding torque and a click torque in the torque generation mechanisms of the rotation shaft and the opening/closing shaft. This invention significantly reduces the number of components and the size of the two-shaft hinge. This invention also enables harness cable wiring by making the center of the rotation shaft hollow.

The second embodiment realizes a highly durable two-shaft hinge because it employs a pair of torque generation mechanisms on the rotation shaft and a plurality of torque generation mechanisms on the opening/closing shaft to stably and securely generate the sliding torque and click torque. This invention significantly reduces the number of components and the size of the two-shaft hinge. This invention also enables harness cable wiring by making the center of the rotation shaft a penetrating hole.

The third and the fourth embodiments generate the sliding torque and the click torque by providing a plurality of the cam mechanisms at the rotation and the opening/closing torque generating portions with each cam having different operation pattern.

The fifth embodiment ensures a stable operation of the fixing cams for the rotation shaft and the opening/closing shaft, and thus contributes to preventing the feeling of looseness and free-play.

The sixth embodiment exerts an effect of obtaining a two-shaft hinge which restricts the rotating angle by mounting a stopper on the rotation and the opening/closing shafts.

The seventh embodiment enables a reduction of the size of the two-shaft hinge by employing a disc spring, a waved plate spring, or a thin plate spring instead of the coil spring.

The eighth embodiment enables harness cable wiring by providing a penetrating hole which penetrates through the center of the rotation shaft.

The ninth, the tenth and the eleventh embodiments contribute to improving the torque transfer characteristic, preventing free-play, and improving in strength and productivity of unit assembling, and even enable a reduction in size of the two-shaft hinge.

The twelfth embodiment enables easy designing and firm attachment of the device by employing a technique of a fixing base.

DETAILED DESCRIPTION

Embodiments of the present invention are described hereinafter with reference to the drawings.

Figure 1:
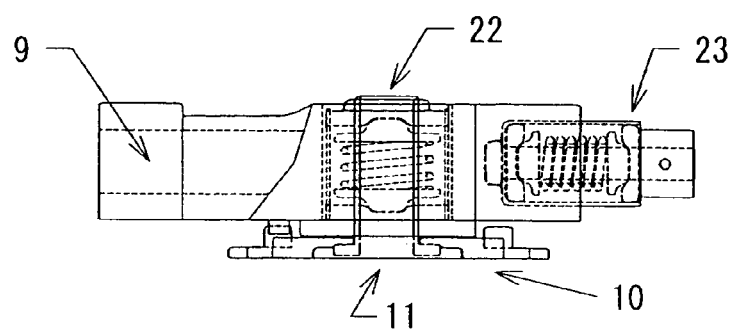
FIG. 1 is a partial cross-sectional front view showing an example of the first, the eighth and the twelfth embodiments.

FIG. 1 shows a partial cross-sectional front view of an example of the first, the eighth and the twelfth embodiments with regard to the two-shaft hinge of the present invention enabling harness wiring. The two-shaft hinge is configured by fitting and attaching a rotation torque unit 22 and an opening/closing torque unit 23 to a hinge housing 9. As shown in the two-shaft hinge in FIG. 1, from the bottom of a rotation shaft 11 to an opening 22 at the top exists a penetrating hole, through which harness cable wiring for an electrical connection can pass. The rotation shaft 11 and a fixing base 10 in FIG. 1 are fitted and fixed to each other, and when attaching the fixing base 10 to a device, the hinge housing 9 can rotate clockwise or counterclockwise around the center of the rotation shaft 11. A torque unit 23 for the opening/closing shaft, which is attached to the hinge housing 9, can rotate with respect to the opening/closing shaft.

Figure 2:
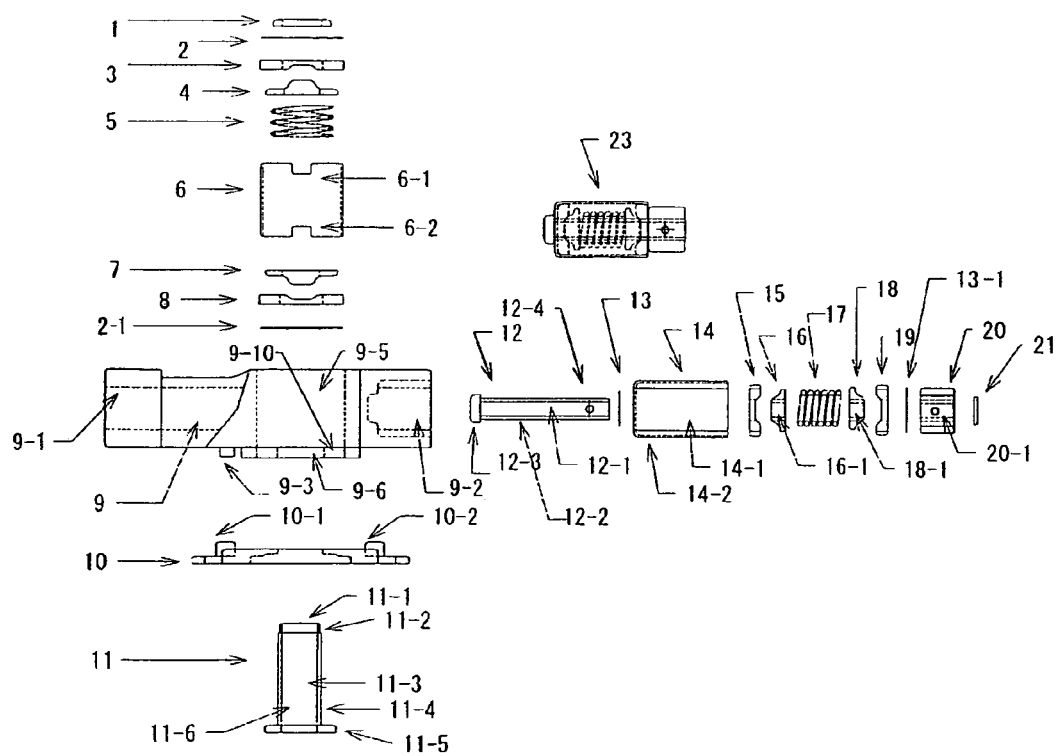
FIG. 2 is a component configuration diagram showing an example of the first, the fifth, the sixth and the eleventh embodiments.

FIG. 2 shows a component configuration diagram of the two-shaft hinge related to an example of the first, the fifth, the sixth and the eleventh embodiments of the present invention. The rotation system comprises components of, from the bottom of the figure, the rotation shaft 11 having an inside hole, the fixing base 10, the hinge housing 9, a lubricating ring 2, a first rotating cam 8, a first fixing cam 7, a case 6 for the rotation shaft, a first coil spring 5, a second fixing cam 4, a second rotating cam 3, a second lubricating ring 2-1 and a caulking ring 1. The opening/closing system comprises an opening/closing shaft 12, a third lubricating ring 13, a case 14 for the opening/closing shaft, a third rotating cam 15, a third fixing cam 16, a second coil spring 17, a fourth fixing cam 18, a fourth rotating cam 19, a fourth lubricating ring 13-1, a bracket 20, and a fixing pin 21.

In the two-shaft hinge shown in FIG. 2, two pairs of rotation torque and opening/closing torque generating portions are provided on each shaft, attached to the case 6 for the rotation shaft and the case 14 for the opening/closing shaft, and assembled as the rotation torque unit 22 and the opening/closing torque unit 23. The assembled opening/closing unit 23 is shown in FIG. 2.

The case 6 for the rotation shaft has grooves 6-1, 6-2 into which protrusions, on outer peripheries of the rotation cams 3, 8 are inserted. In the hinge housing 9, a hole 9-6 through which the rotation shaft 11 pierces, a space 9-5 to which the rotation torque unit 22 is fitted and attached, a hole 9-2 to which the opening/closing shaft torque unit 23 is fitted and attached, a protrusion 9-3 to restrict the rotating angle, and a hole 9-1 through which a harness wiring can pass, are provided. The fixing base 10 has, at the center, a hole through which the rotation shaft pierces, and protrusions 10-1, 10-2 which abut on the protrusion 9-3 of the hinge housing for rotation restricting, to restrict the rotation. A rotation range of the housing portion in the example of FIG. 2 is set to 180°, which allows the protrusion 9-3 of the housing to rotate clockwise from an initial position where it first abuts on the left protrusion 10-1 of the base to a position where it abuts on the right protrusion 10-2.

The opening/closing shaft 12 has a deformed cross-section such that the cross-sections for the center portion 12-1 and the bottom portion 12-2 of the opening/closing shaft 12 in FIG. 2 are an oval shape. Similarly, the cross-sectional shape of the case 14 for the opening/closing shaft is an oval shape, and the outer peripheries of the rotating cams 15, 19 used to be fitted and attached to the inside are partially cut to be an oval as shown in FIGS. 8(a), 8(b), and 8(c). The combinations of the cases 6, 14 and the rotating cams 3, 8, 15, 19 shown in FIG. 2 were explained in each of the cases of the grooves and the ovals, but it can employ either design which is advantageous in terms of the fitting formation, the reduction in size, and the strength.

A metal or resin can be used as the material of the components used in the two-shaft hinge of the present invention shown in FIG. 2, and heat treatment and surface treatment are accordingly carried out appropriately.

Figure 3:
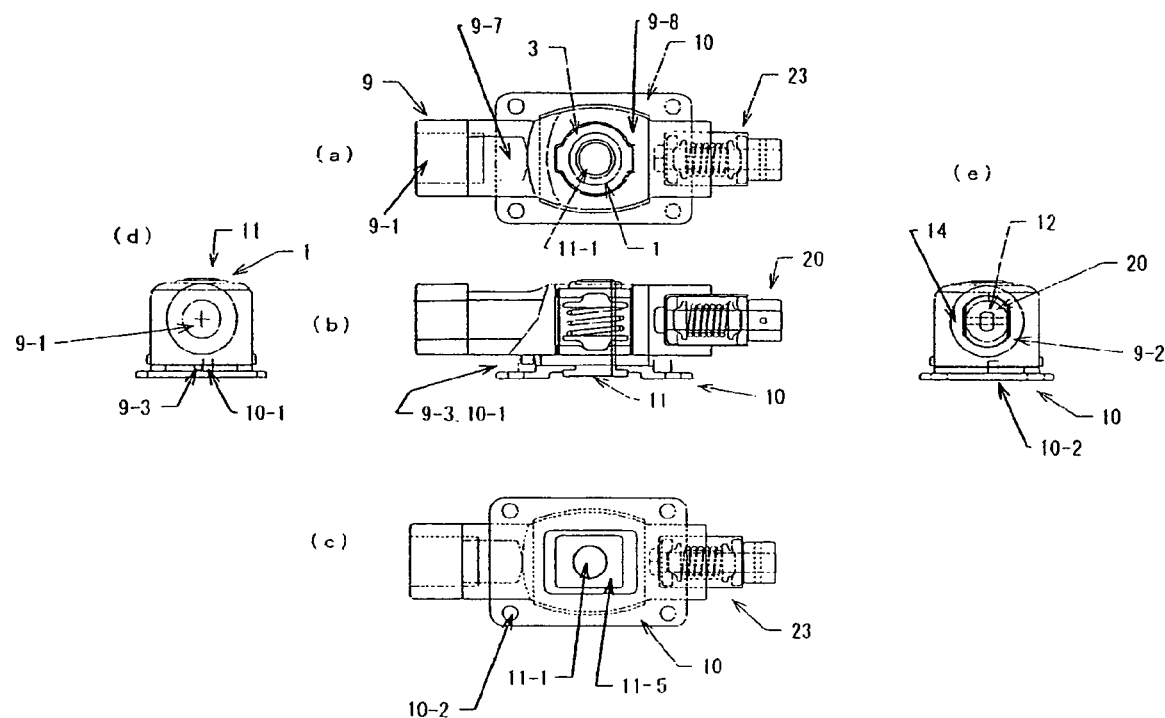
FIGS. 3(a), 3(b), 3(c), 3(d) and 3(e) are, respectively, a top view, a front view, a bottom view, a left side view, and a right side view.

FIG. 3 shows a two-shaft hinge according to the first, the sixth, the eighth and the twelfth embodiments of the present invention. FIG. 3(a) is a top view, 3(b) is a front view, 3(c) is a bottom view, and, 3(d) and 3(e) are side views.

In the top view of FIG. 3(a), a penetrating hole 11-1 is present at the center of the rotation shaft 11, and, on the left side of the housing 9, a through-hole 9-1 is provided from a side portion 9-7 to the end of the housing 9. A part of a space at the center portion of the housing 9 has a structure of a concave groove 9-8, and the protrusion of the rotating cam 3 of the rotation torque unit 22 is fitted and attached to the groove 9-8, whereby the hinge has a structure in which a sliding torque and a click torque of the rotation torque unit 22 are transmitted securely without causing a free-play.

The bottom view of FIG. 3(c) shows a state where the rotation shaft 11 is fitted and attached to the base 10, and flange 11-5 on the lowest portion of the rotation shaft 11 has a square shape to prevent the occurrence of the free-play in rotation. A hole 10-2 to fix a device is provided on each of the four corners of the base 10.

The left side view of FIG. 3(d) shows a state that the shaft through-hole 9-1 and the rotation stopper abut each other.

The right side view of FIG. 3(e) shows a state that the shape of the case 14 incorporating the opening/closing shaft 12 and the opening/closing torque unit 23 is oval.

Figure 4:
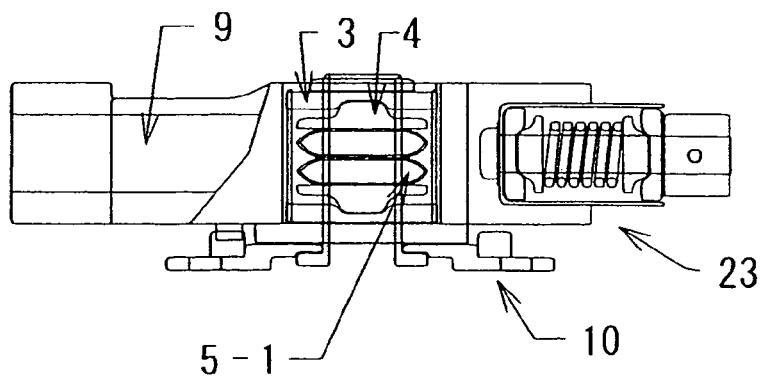
FIG. 4 is a partial cross-sectional front view showing the seventh embodiment.
Figure 9:
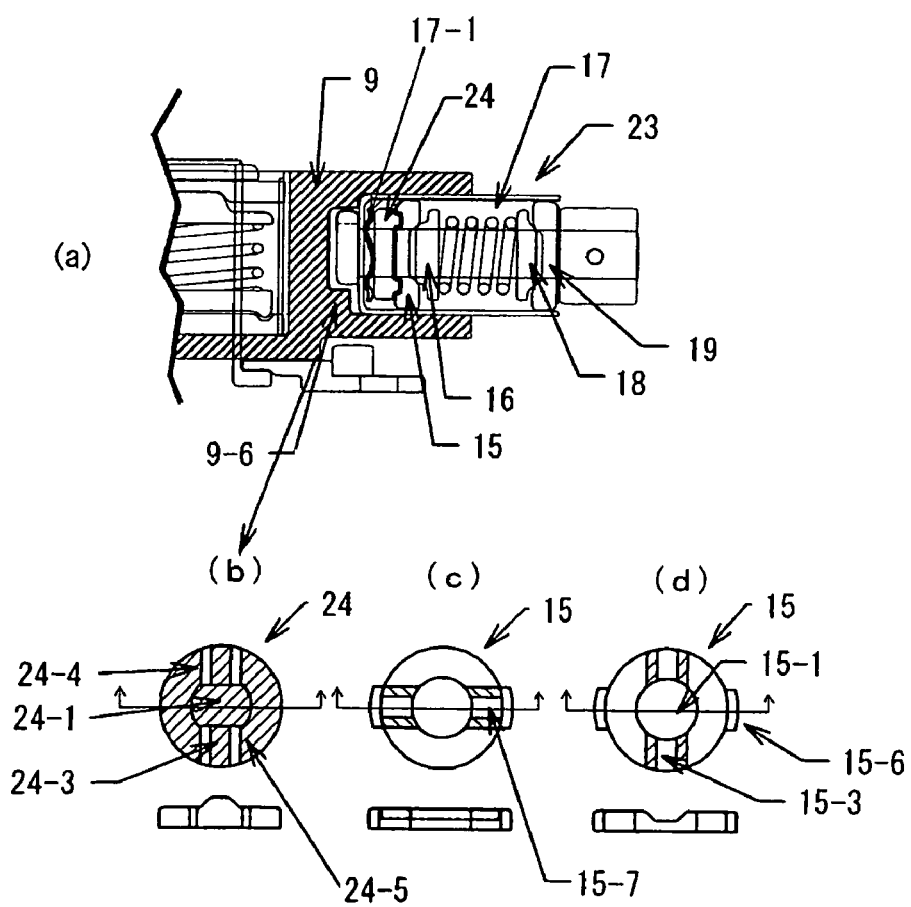
FIG. 9(a) is a partial cross-sectional view of the fourth and the seventh embodiments. The upper portions of FIGS. 9(b), 9(c) and 9(d) are partial plan views of the fixing cam and the rotating cam, and the lower portions of FIGS. 9(b), 9(c) and 9(d) are cross-sectional views of the same.

FIG. 4 is an example showing the two-shaft hinge of the seventh embodiment of the present invention, wherein a disc spring is used instead of the coil spring. An example in which a waved plate spring is used is shown in FIG. 9.

Figure 5:
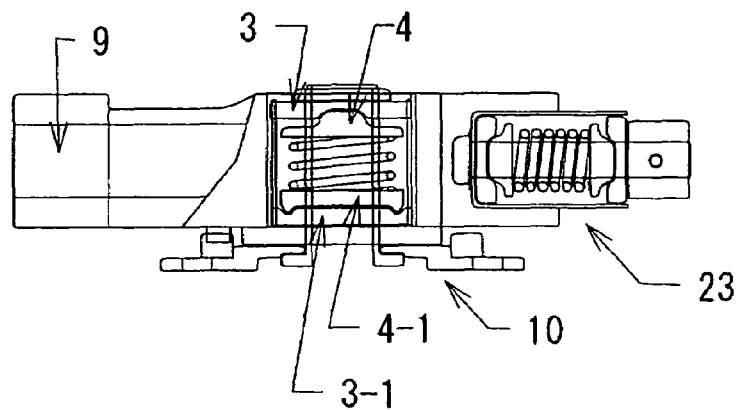
FIG. 5 is a partial cross-sectional front view showing the third embodiment.
Figure 6:
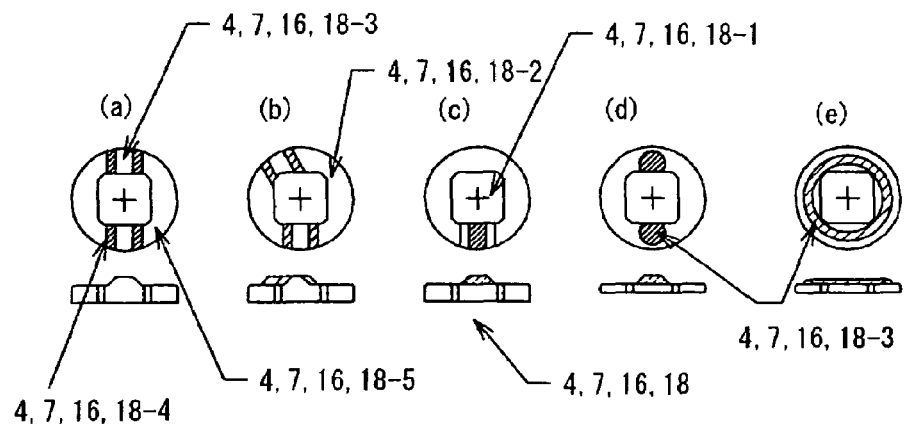
FIGS. 6(a), 6(b), 6(c), 6(d) and 6(e) are componential drawings of the fixing cams of the rotation and the opening/closing torque generating portions.
Figure 7:
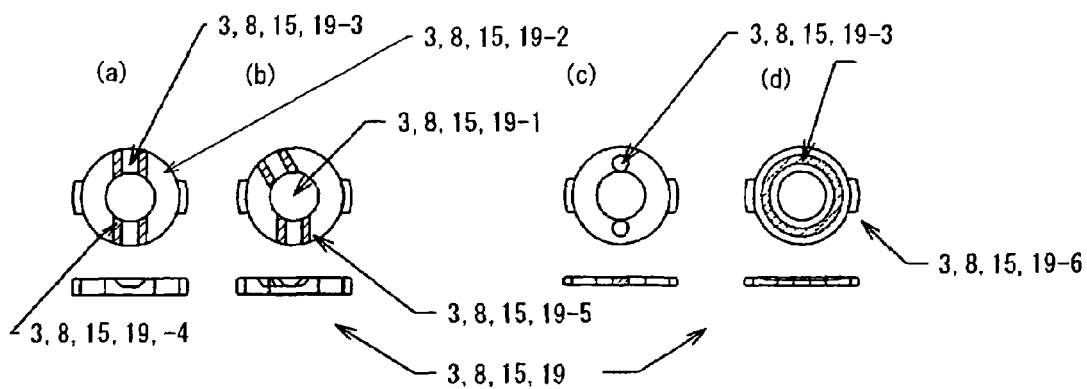
FIGS. 7(a), 7(b), 7(c) and 7(d) are componential drawings of the rotating cams of the rotation and the opening/closing torque generating portions.
Figure 8:
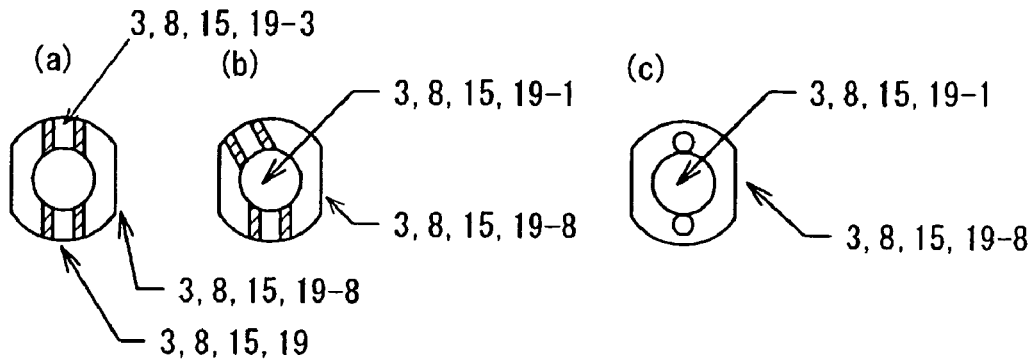
FIGS. 8(a), 8(b) and 8(c) are componential drawings of the rotating cams of the rotation and the opening/closing torque generating portions.

FIG. 5 is an example showing the two-shaft hinge of the third embodiment of the present invention, wherein the fixing cam 4-1 and the rotating cam 3-1 on a lower portion, which are used in the torque generating portion of the rotation shaft, are different from the fixing cam 4 and the rotating cam 3 on an upper portion with regard to the concave groove and the convex protrusion formed on abutting surfaces. FIGS. 6-8 show the shape of the cam-abutting surfaces. Thus, combination of the fixing cam and the rotating cam can be employed appropriately in accordance with the magnitude and the position of the sliding torque and the click torque in rotation and opening/closing operation of the two-shaft hinge.

FIGS. 6(a), 6(b), 6(c), 6(d) and 6(e) show examples of the shapes for the abutting surface of the fixing cam 4, 7, 16, 18 for the rotation torque generation and the opening/closing torque generation, which are used in the two-shaft hinge of the present invention. In all of these examples, a hole 4, 7, 16, 18-1 into which the rotation shaft or the opening/closing shaft is inserted is in the form of a quadrangle. When the hole 4, 7, 16, 18-1 is put around the shaft of a similar shape, the cams can move in the axial direction but they are inhibited from rotating with respect to the shaft. The convex protrusion on the abutting surface is provided so that the flat surface 4, 7, 16, 18-5 and the inclined surface 4, 7, 16, 18-4 are formed. The shape of the convex protrusion 4, 7, 16, 18-3 formed on the cam-abutting surface can be a groove-like shape, a projection-like shape, or a circular shape, and the shape can be selected appropriately in accordance with the torque request such as the cam number or the setting angle.

FIGS. 7(a), 7(b), 7(c) and 7(d) show examples of the shape for the abutting surface of the rotating cam 3, 8, 15, 19 for the rotation torque generation and the opening/closing torque generation, which are used in the two-shaft hinge of the present invention. In all of these examples, a hole 3, 8, 15, 19-1 into which the rotation shaft and the opening/closing shaft is inserted is a circular hole. When the hole 3, 8, 15, 19-1 is putting around the shaft of which cross-section is a deformed shape, the cams can rotate with respect to the shaft. The concave groove on the abutting surface is formed from the flat surface 3, 8, 15, 19-2 through the inclined surface 3, 8, 15, 19-4. The shape of concave groove 3, 8, 15, 19-3 formed on the cam abutting surface can be a groove-like shape, a projection-like shape, or a circular shape, and can be selected appropriately to employ in accordance with the torque request such as the cam number or the setting angle. On an outer periphery of the rotating cam, a protrusion 3, 8, 15, 19-6 are provided to be fitted and attached to the grooves 6-1, 6-2 of the case 6, 14 for the rotation shaft and the opening/closing shaft.

It is noted that the above-mentioned fixing cam and the rotating cam are examples, and other variations are also possible as long as a torque is generated on the abutting surface between the fixing cam and the rotating cam.

FIG. 8 shows an example, wherein the rotating cams have the concave groove 3, 8, 15, 19-3 similar to the rotating cams shown in FIG. 7 and an outer periphery 3, 8, 15, 19-8 cut into an oval shape.

In the examples shown in FIGS. 6-8, the fixing cam 4, 7, 16, 18 forms a convex protrusion on the abutting surface, and the rotating cam 3, 8, 15, 19 forms a concave groove on the abutting surface. However, in the present invention, the concave groove may be formed on the fixing cam and the convex protrusion may be formed on the rotating cam. The abutting surface to form the protrusion and the groove is not limited to one side of the cam, and thus the cam in which the abutting surfaces are formed on both sides of the cam as shown in the example of the rotating cam 15 in FIG. 9(a) can be used.

FIG. 9(a) is an example showing the two-shaft hinge of the fourth and the seventh embodiments of the present invention. Three pairs of the torque generating portions for the opening/closing shaft (abutting surfaces of 15 with 24, 15 with 16, 18 with 19) are mounted, and a waved plate spring 17-1 is mounted. The fixing cams 16, 24 are abutted on both sides of the rotating cam 15 in a sandwich pattern. On both sides of the rotating cam 15, the concave grooves are formed. Thus, the generating portions, together with three pairs of the abutting surfaces, give more complex sliding and click torque generating patterns at the opening/closing operation. A plurality of the click torques can also be generated with limited rotating angles.

FIGS. 9(b), 9(c) and 9(d) show the convex protrusions and the concave grooves on the abutting surfaces of the fixing cam 24 and the rotating cam 15 used in FIG. 9(a). The rotating cam 15 shows an example that the angles of the concave grooves on the front and back of the abutting surface are different by 90° as shown in FIGS. 9(c) and 9(d). The present invention, which enables the complex click operation by combining the angles of the protrusions of the fixing cams 16, 24 and the angles of the concave grooves formed on both sides of the rotating cam 15, also enables an operation which cannot be realized by one pair of the rotating and the fixing cams. The present invention is extremely effective in enhanced durability against wear and tear which occurs on the cam-abutting surface at the torque generation and in stability of the torque, whereby a long-life hinge without wearing away can be realized.

Figure 10:
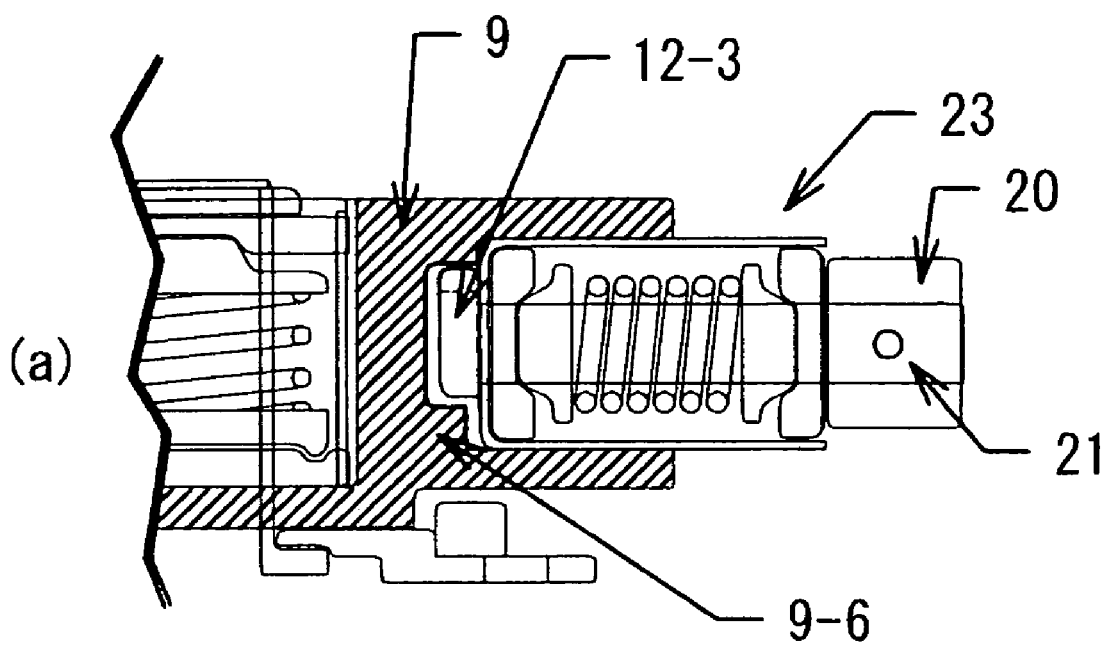
FIGS. 10(a) and 10(b) are a cross-sectional view and a component configuration diagram of the sixth embodiment, respectively.
Figure 10:
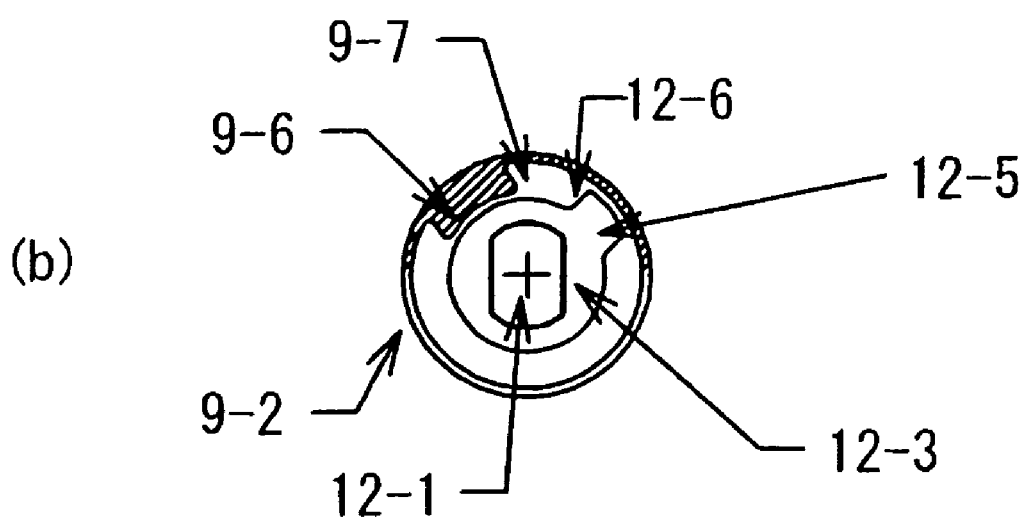

FIG. 10(a) is an example showing the two-shaft hinge of the sixth embodiment of the present invention, wherein a stopper mechanism to limit the rotating angle of the opening/closing shaft 12 is mounted. The angle limiting stopper mechanism is achieved by abutting the protrusion 12-5 of the opening/closing shaft 12 on the protrusion 9-6 provided in the hinge housing 9.

FIG. 10(b) shows an example in which the protrusion 12-5 is provided in a part of a flange 12-3 of the oval-shaped center part 12-1 in the opening/closing shaft 12, and a both-side portion 12-6 of the protrusion 12-5 is abutted on a both-side portion 9-7 of the protrusion 9-6 provided in the hinge housing 9. FIG. 9(b) shows an example in which the protrusion 12-5 of the opening/closing shaft 12 is formed across approximately 30°, the protrusion 9-6 of the hinge housing 9 is formed across approximately 60°, and the rotation shaft 11 can rotate through approximately 270°.

Figure 11:
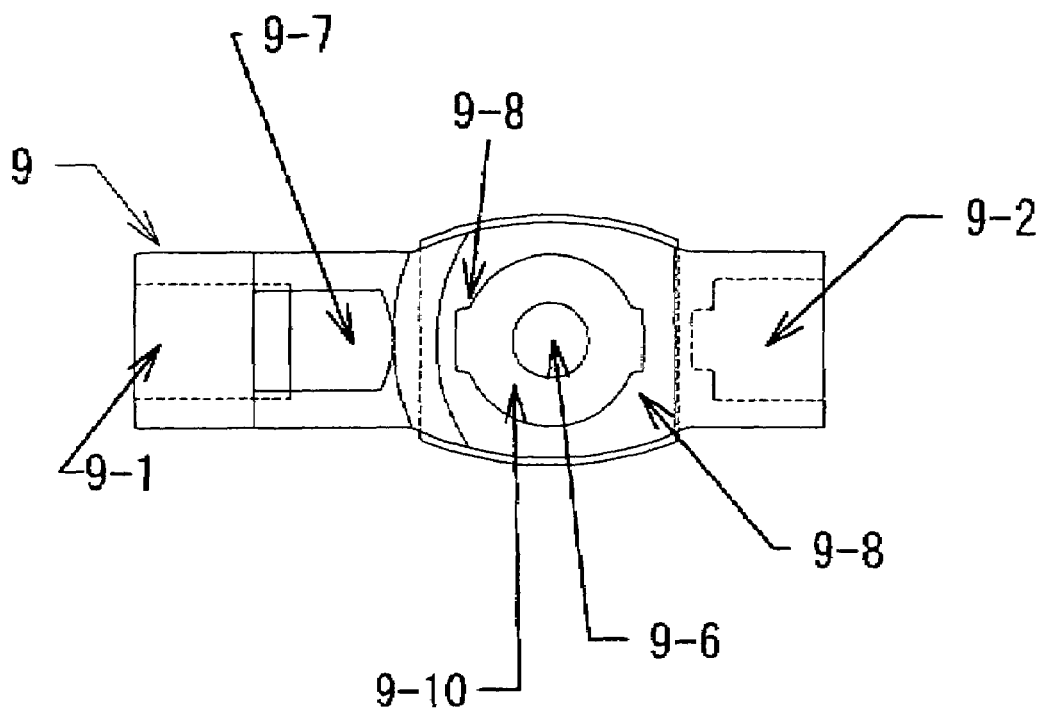
FIG. 11 is an appearance of a hinge housing.

FIG. 11 shows an appearance of the hinge housing 9 used in the present invention. A hole 9-6, a bottom 9-10 and a groove 9-8 are formed in the middle, a through-hole 9-1 is formed in the left section, and an insertion hole 9-2 of the opening/closing shaft torque unit 23 is formed in the right section.

Figure 12:
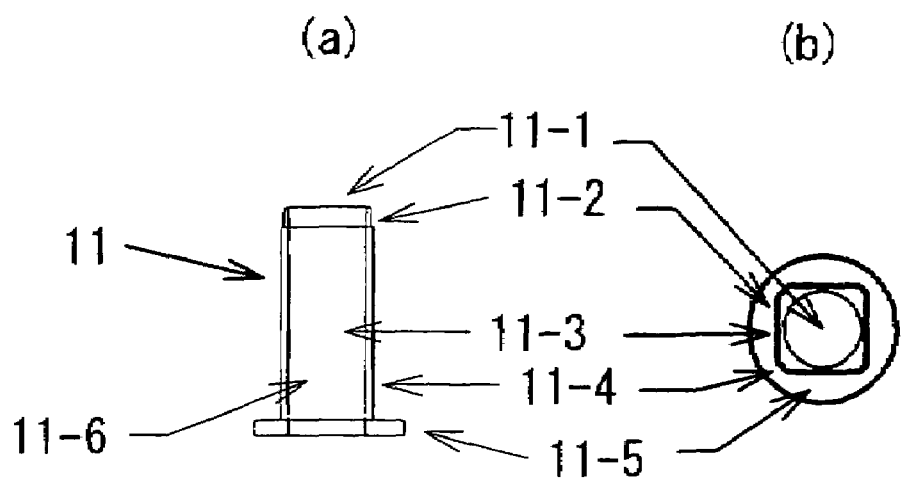
FIGS. 12(a) and 12(b) are a front view and a top view of the rotation shaft.

FIGS. 12(a) and 12(b) show the rotation shaft 11. The shaft has a penetrating hole 11-1, a step 11-2 to which the caulking ring 1 is put around and fixed, a square surface 11-3, 11-4 fitted with the fixing cam 4, 7, a circular surface 11-4 which rotates after the rotating cams 3, 8 are put around, and a fixing flange 11-5.

Figure 13:
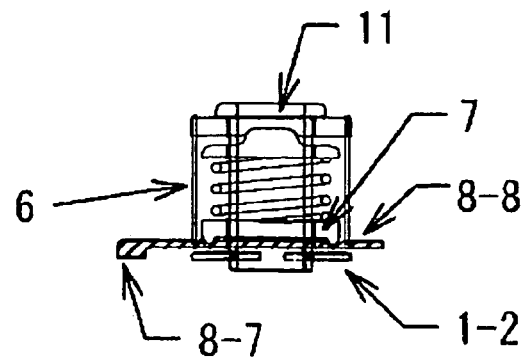
FIG. 13 is a partial cross-sectional front view of the tenth and the eleventh embodiments.

FIG. 13 is an example showing the two-shaft hinge of the tenth and the eleventh embodiments of the present invention. The figure shows an example that the rotating cam 8 of the rotation torque generating portions is omitted to reduce the height of the two-shaft hinge. Instead, an additional member 8-7 is incorporated so that a bottom 9-10 of the hinge housing 9 is shared with the member 8-7. By using the additional member, not only can the number of the components be reduced but also the strength of the hinge can be enhanced. The rotation torque unit shown in FIG. 13 shows an example of a structure in which a stop ring 1-2 is assembled to one side of the rotation shaft 11 so that the rotation torque unit 22 can be assembled in the offline setup.

Figure 14:
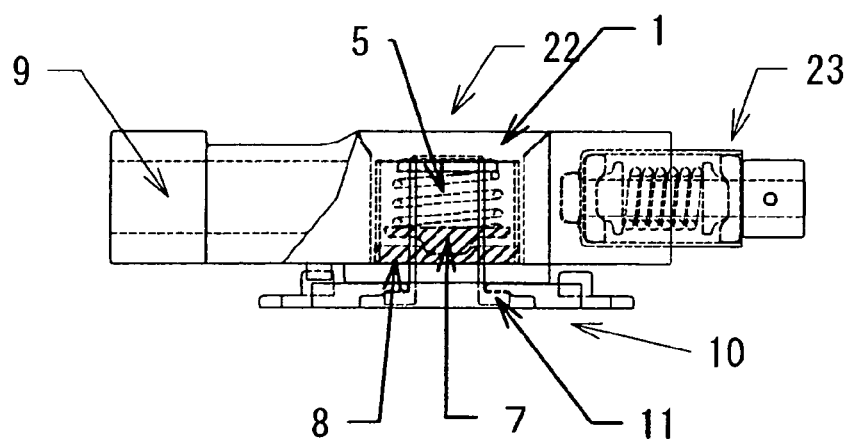
FIG. 14 is a partial cross-sectional front view of the second embodiment.
Figure 15:
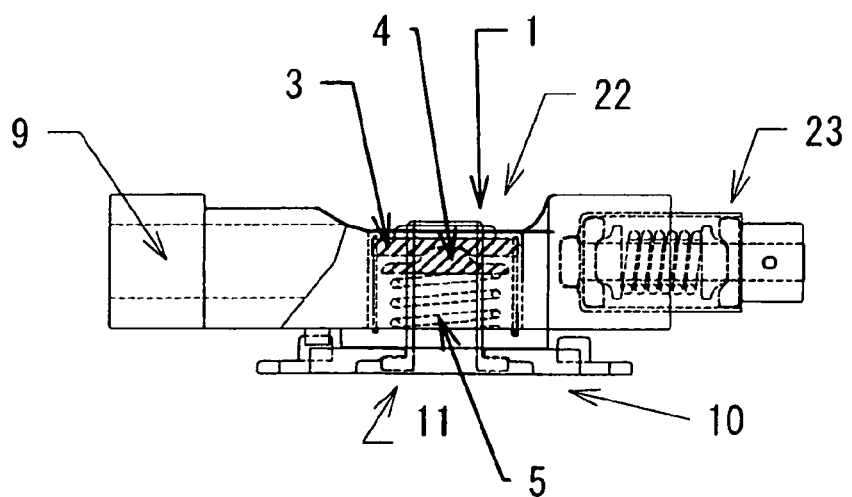
FIG. 15 is a partial cross-sectional front view of the second embodiment.
Figure 16:
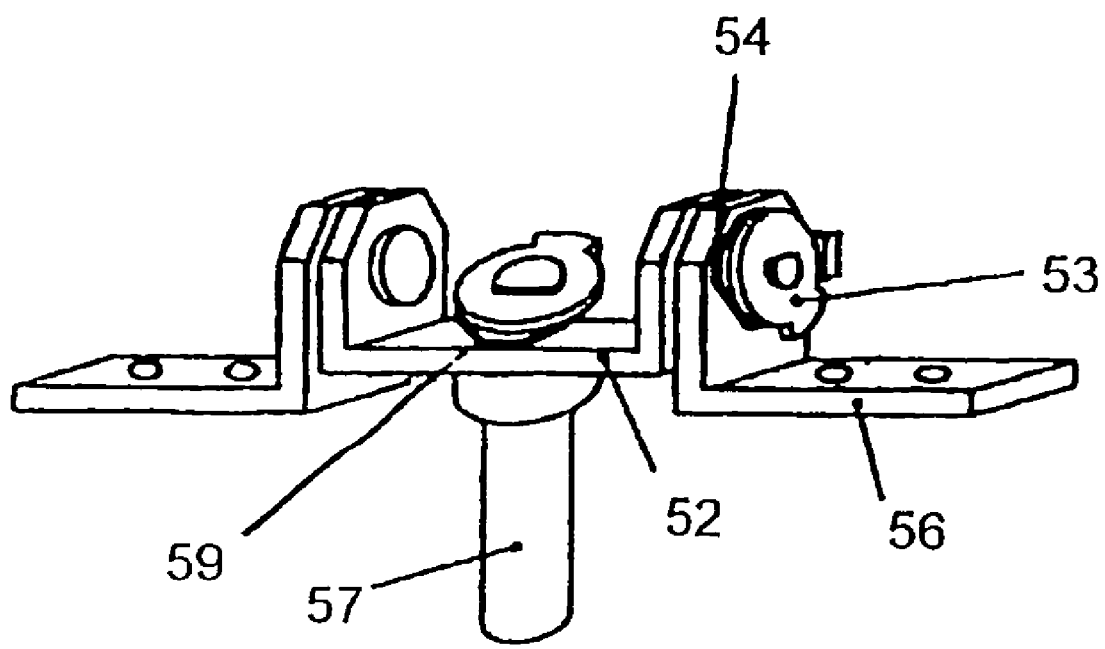
FIG. 16 is a front view of an example of a conventional two-shaft hinge.

FIGS. 14 and 15 are examples showing the two-shaft hinge of the second embodiment of the present invention. FIG. 14 shows an example in which the rotation torque generating portion is mounted on a lower portion of the coil spring 5. FIG. 15 shows an example in which the rotation torque generating portion is mounted on an upper portion of the coil spring 5. The rotation torque unit 22 is assembled by inserting the rotation shaft 11 into a pair of the fixing cam 4.7 and the rotating cam 3, 8, and the coil spring 5. Then, the rotation torque unit 22 is caulking-fixed by the caulking ring 1. The present invention can be employed in a case of reducing the space or the height of the upper portion of the rotation torque unit 22 as shown in FIGS. 14 and 15.

The invention claimed is:
1. A two-shaft hinge having a two-shaft structure, comprising:
   a rotation shaft having an axially penetrating hole through which a harness wiring can pass;
   an opening/closing shaft;
   a rotation torque unit in which a plurality of rotation torque generating portions are provided on the rotation shaft, the rotation torque generating portions being assembled by putting a first coil spring around an outer periphery of the rotation shaft and by abutting a first fixing cam and a first rotating cam on both ends of the first coil spring; and
   an opening/closing torque unit in which a plurality of opening/closing torque generating portions are provided on the opening/closing shaft, the opening/closing torque generating portions being assembled by putting a second coil spring around the opening/closing shaft and by abutting a second fixing cam and a second rotating cam on both ends of the second coil spring, an elongate hinge housing extending coaxially with the opening/closing shaft, wherein the rotation shaft penetrates the elongate hinge housing such that the axis of the rotation shaft and the axis of the opening/closing shaft are perpendicular to each other, the rotation shaft extending through the entire diameter of the elongate hinge housing, the elongate hinge housing having a first through-hole through which the rotation shaft pierces on one side of the rotation torque unit and a second through-hole through which the harness wiring can pass on the other side of the rotation torque unit, the torque units generate a sliding torque and a click torque at rotation, and an opening/closing operation function on the rotation shaft and the opening/closing shaft, and the opening/closing torque unit is assembled to either a right side or a left side of the rotation torque unit.

2. A two-shaft hinge having a two-shaft structure, comprising:

a rotation shaft having an axially penetrating hole through which a harness wiring can pass;

an opening/closing shaft;

a rotation torque unit in which a pair of rotation torque generating portions are provided on the rotation shaft, the rotation torque generating portions being assembled by putting a first coil spring around an outer periphery of the rotation shaft and by abutting a first fixing cam and a first rotating cam on both ends of the first coil spring; and an opening/closing torque unit in which a plurality of opening/closing torque generating portions are provided on the opening/closing shaft, the opening/closing torque generating portions being assembled by putting a second coil spring around the opening/closing shaft and by abutting a second fixing cam and a second rotating cam on both ends of the second coil spring, an elongate hinge housing extending coaxially with the opening/closing shaft, wherein the rotation shaft penetrates the elongate hinge housing such that the axis of the rotation shaft and the axis of the opening/closing shaft are perpendicular to each other, the rotation shaft extending through the entire diameter of the elongate hinge housing, the elongate hinge housing having a first through-hole through which the rotation shaft pierces on one side of the rotation torque unit and a second through-hole through which the harness wiring can pass on the other side of the rotation torque unit, the torque units generate a sliding torque and a click torque at rotation, and an opening/closing operation function on the rotation shaft and the opening/closing shaft, and the opening/closing torque unit is assembled to either a right side or a left side of the rotation torque unit.

3. The two-shaft hinge according to claim 1, wherein the rotation torque unit is assembled on the rotation shaft, and a plurality of the rotation torque generating portions are assembled on the rotation torque unit and have torque generating operations to generate the sliding torque and the click torque by abutting the first fixing cam and the first rotating cam, the torque generating operations being different and independent to one another by combining the first fixing cam and the first rotation cam having different positions of a concave groove and a convex protrusion of the first fixing cam and the first rotation cam or by combining different numbers of the cams.

4. The two-shaft hinge according to claim 1, wherein the opening/closing torque unit is assembled on the opening/closing shaft, and a plurality of the opening/closing torque generating portions are assembled on the opening/closing torque unit and have torque generating operations to generate the sliding torque and the click torque by abutting the second fixing cam and the second rotating cam, the torque generating operations being different and independent to one another by combining the second fixing cam and the second rotation cam having different positions of a concave groove and a convex protrusion of the second fixing cam and the second rotation cam or by combining different numbers of the cams.

5. The two-shaft hinge according to claim 1, wherein a cross-section of a part of the rotation shaft and the opening/closing shaft is other than a circle, or is formed to be a quadrangle or a shape having a major axis and a minor axis, allowing the first and the second fixing cams for rotation and opening/closing, which are used respectively in the rotation torque generating portions and the opening/closing torque generating portions, to move respectively in the axial direction of the rotation shaft and the axial direction of the opening/closing shaft, but inhibiting the first and the second fixing cams from rotating with respect to the rotation shaft.

6. The two-shaft hinge according to claim 1 further comprising a stopper mechanism to restrict a rotation angle and an opening/closing angle of the rotation shaft and the opening/closing shaft so that rotation ranges of the rotation shaft and the opening/closing shaft are restricted.

7. The two-shaft hinge according to claim 1 further comprising a disc spring, a waved plate spring, or a thin plate spring in place of the first and the second coil springs which generate an abutting force in the torque generating portions used in the rotation torque unit and the opening/closing torque unit.

8. The two-shaft hinge according to claim 1, wherein the rotation shaft having the penetrating hole in which a through-hole is provided at a center of the rotation shaft, in order to enable the harness wiring.

9. The two-shaft hinge according to claim 1, wherein a case for the rotation shaft and a case for the opening/closing shaft in each of which an outer periphery has a groove or a deformed cross-section other than a circle are fitted with or fixed to the first and the second rotating cams in each of which an outer periphery has a protrusion or a deformed cross-section, in order to effectively transmit a sliding torque force and a click torque force, which are generated in the first and the second rotating cams used on the rotation shaft and the opening/closing shaft, to the elongate hinge housing.

10. The two-shaft hinge according to claim 1, wherein the first rotating cam used in the rotation torque generating portions is configured to be a bottom portion to which the rotation torque unit is fitted and attached in the elongate hinge housing, to reduce the number of components and size, and improve the strength of the elongate hinge housing.

11. The two-shaft hinge according to claim 1, wherein the rotation torque unit and the opening/closing torque unit are assembled as an independent unit, the torque units being fitted and attached to or screwed into the elongate hinge housing in which a means for fitting or screwing to fix is provided in advance.

12. The two-shaft hinge according to claim 1 further comprising a fixing base component adhered to the rotation shaft for mounting and fixing the two-shaft hinge to a device chassis, wherein the two-shaft hinge is fixed by the base component.

* * * * *

UNITED STATES PATENT AND TRADEMARK OFFICE
CERTIFICATE OF CORRECTION

PATENT NO.        : 7,614,118 B2
APPLICATION NO.   : 10/581917
DATED             : November 10, 2009
INVENTOR(S)       : Sato et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 239 days.

Signed and Sealed this

Nineteenth Day of October, 2010

David J. Kappos
*Director of the United States Patent and Trademark Office*